(No Model.) 2 Sheets—Sheet 1.

G. W. MILLER.
RAILROAD VELOCIPEDE.

No. 547,019. Patented Oct. 1, 1895.

Witnesses:
Walter S. Wood,
Marian Longyear

Inventor,
George W. Miller
By Fred L. Chappell
Atty.

(No Model.) 2 Sheets—Sheet 2.

G. W. MILLER.
RAILROAD VELOCIPEDE.

No. 547,019. Patented Oct. 1, 1895.

Witnesses:
Walter S. Wood
Marian Longyear

Inventor,
George W. Miller
By Fred L. Chappell
Atty.

UNITED STATES PATENT OFFICE.

GEORGE W. MILLER, OF KALAMAZOO, MICHIGAN.

RAILROAD-VELOCIPEDE.

SPECIFICATION forming part of Letters Patent No. 547,019, dated October 1, 1895.

Application filed December 31, 1894. Serial No. 533,459. (No model.)

*To all whom it may concern:*

Be it known that I, GEORGE W. MILLER, a citizen of the United States, residing at the city of Kalamazoo, in the county of Kalamazoo and State of Michigan, have invented certain new and useful Improvements in Railroad-Velocipedes, of which the following is a specification.

My invention relates to improvements in railway-velocipedes, and is a special adaptation of a safety-bicycle for use upon a railway-track.

The objects of my invention are, first, to provide a light, convenient, and noiseless vehicle for traveling upon the rails of a railroad-track; second, to provide, in a railroad-velocipede, against friction between the wheels thereof and the rails, as much as possible; third, to provide, in a railroad-velocipede, convenient means of steering the same to assist in reducing friction; fourth, to provide an improved railroad-velocipede of light weight for carrying two persons; fifth, to provide a railroad-velocipede having improved wheels; sixth, to provide improvements in tires for the wheels of railroad-velocipedes; seventh, to provide an improved frame for light railroad-velocipedes, and other objects appearing in the detailed description.

I accomplish these objects of my invention by the devices shown in the accompanying drawings, in which—

Figure 1:
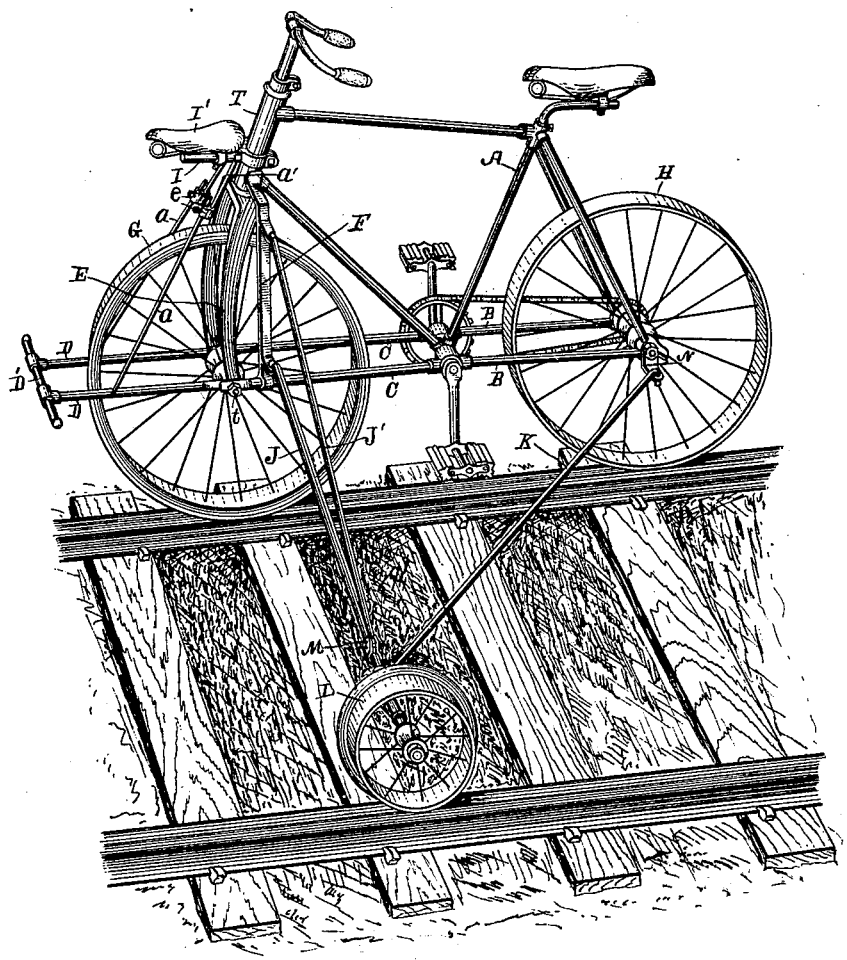
Figure 2:
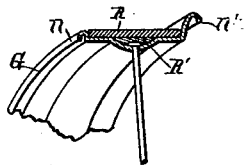
Figure 3:
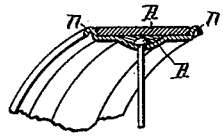
Figure 4:
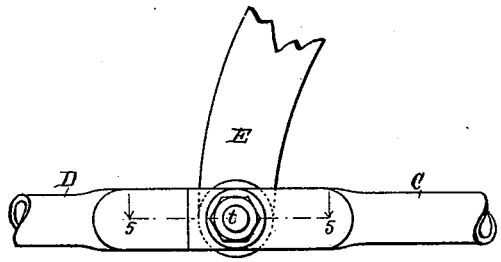
Figure 6:
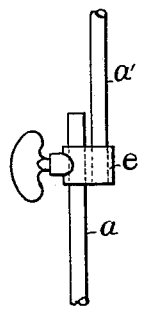
Figure 5:
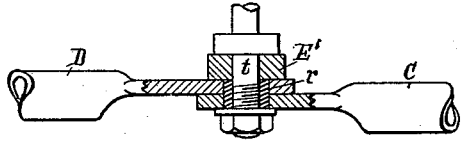
Figure 7:
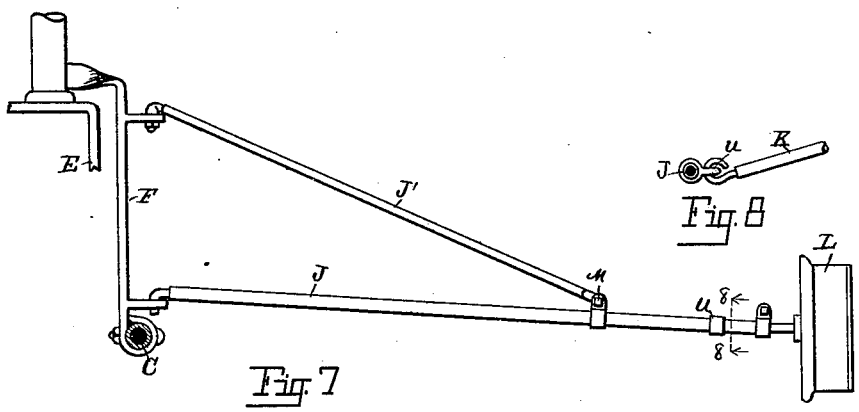
Figure 8:
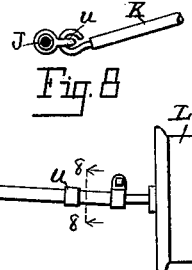

Figure 1 is a view showing a railroad bicycle or velocipede embodying all of the features of my invention. Fig. 2 is a cross-sectional view of the tire and rim or felly of the forward wheel. Fig. 3 is a cross-sectional view of the tire and rim or felly of the rear wheel. Fig. 4 is a detail view of a broken portion of a part of Fig. 1. Fig. 5 is a sectional view on line 5 5 of Fig. 4, showing more distinctly the details of that part. Fig. 6 shows a detail of the adjustment for the foot-rests. Fig. 7 is a detail showing the connection of the swinging arm to the main frame of the velocipede. Fig. 8 is a sectional view on line 8 8 of Fig. 7.

Similar letters of reference refer to similar parts throughout the several views, and all of the sectional views are taken looking in the direction of the little arrows at the ends of the section-lines.

In the drawings, the main frame of the velocipede is somewhat similar to the diamond-shaped frame of the ordinary safety-bicycle, with the exception that the bars C extend forward from the lower point of the frame and engage the axle $t$ at the lower end of the fork. These bars C serve to strengthen the frame very much. In the forward ends of the bars C are situated rubber bushings or cushions $r$, surrounding the axle $t$, these being supported by a suitable washer E', secured by a nut on the axle $t$ on the outside. On this same axle are pivoted forwardly-extending arms D, which are made preferably of tubing to make them light, and a cross-piece D' extends across the front end of the same to serve as a foot-rest.

The seat I' is securely fastened to the head T of the frame of the machine. This is supported by the forwardly-projecting rod I, clamped at that point. Extending down from the seat are rods $a$ $a'$, containing adjustable clamps $e$ $e$, which adjust the height of the foot-rests D' in front.

To the side of the head T of the main frame of the velocipede and to one of the bars C, I attach a bended bar F, as will readily be seen in Fig. 7. Through suitable lugs on this bar are pivoted swinging arms J J', which extend across the track and support the guide-wheel L, the arms J J' being pivoted together to allow the same to be adjusted and folded. The rod K serves as a brace, extending from a clip $u$, near the guide-wheel, back to a lug or ear N on the rear axle of the machine. This brace can be easily unhooked, and allows the machine to fold in a compact form similar to my improved railroad-velocipede shown in Letters Patent No. 473,596, issued April 26, 1894.

The fellies or rims of my improved machine are made, preferably, of thin sheet metal, which is rolled or stamped into the form indicated in Figs. 2 and 3. Fig. 2 shows a section of the forward wheel, and the flange $n'$ is turned up to come on the side of the wheel toward the inside of the machine. A small bead $n$ is turned up on the outside of the wheel, and a corrugation or groove is formed in the central portion of the wheel, so that the corrugated iron strengthens and increases the resistance of the felly or rim of the wheel. The groove around the center of the rim of the wheel serves as a recess to receive the head of the spokes of the wheel, which are attached at that point. In this depression and over the heads of the spokes extends a small rubber cushion R', and around the outside of this extends a flat cushion-tire R, which is between the flange n' and the bead n, which protects the edge of the tire. The rear wheel is made in the same way, with the exception of the flange upon the wheel, none being necessary, each side being beaded at n and the groove at the center being made to receive the head of the spokes and the cushion R', covering the same. The tire R is on the wheel the same as before. The beads n keep the tire in place and protect its edges from wear and strengthen the wheel.

In use my improved velocipede is very satisfactory, indeed. When placed upon the track and operated, the flanges on the guide-wheel L or on the main wheels G will only come in contact with the head of the rail at long intervals. As soon as the flange strikes against the rail, it will cause a metallic ringing, when the operator, simply grasping the handles, turns the wheel in the very slightest degree and guides it upon the track, so that the head of the rail comes near the center of the broad rubber tires of the wheels, and the machine is consequently almost entirely noiseless and frictionless.

The rubber tire, as I said before, is protected at the edges by the flange n' and the beads n turned up upon the same, and at its center is protected from wear from the heads of the spokes by the same being sunk into grooves or depressions and covered by the rubber cushion R', the annular corrugations around the wheel serving at the same time to greatly strengthen the same.

The rubber bushing r on the axle t permits the slight movement above referred to, to assist in guiding the machine. This is a very material advantage in passing the machine around curves. It enables the operator to guide the machine exactly to the curve and swing around the most difficult curves with the greatest facility.

I desire to state that my improved railroad-velocipede can be considerably varied in its details without departing from my invention. For instance, in the construction of the rim of the wheel the cushions R' may be omitted. The wheels could be entirely changed and made different and be used with my improved frame without departing from my invention in regard to the frame; and, instead of using the rubber bushing or cushion, as r, metallic springs could be readily adapted to accomplish the same result; and whether the spring was used as a bushing or not is immaterial, so long as it permits a slight turning of the fork E of the wheel, and the foot-rest D' and the seat I' could be omitted or be made detachable when it is designed to use my machine for one person only. I, however, show the very best form and construction for the purpose, and one possessing great merits over any other.

Having thus described my invention, what I claim as new, and desire to secure by Letters Patent, is—

1. In a railroad velocipede, the combination of the frame constructed similar to the diamond-shaped frame of a safety bicycle; the forwardly extending rods, C, C, engaging the axle, t; the axle, t, at the lower end of the fork; the rubber cushion or bushing, r, around the forward axle, t, the front fork of the bicycle being slightly movable by means of said bushing, r; the forwardly extending arms, D, D, with the cross-piece, D', to form a foot rest in front of the machine; a seat, I', supported by a suitable clamp to the head of the frame of the machine; the rods, a, a', connected to the front seat portion of the machine and extending downwardly to support the arms, D, D; clamps, e, for adjusting the lengths of said rods, a, a', to make the foot rest adjustable; a bent bar, F, attached to the head of the machine and one of the rods, C, and supporting suitable lugs or brackets; the folding arm, J, with its brace, J', pivoted to said arm, F; the brace rod, K, connected to said arm, J, and adapted to detachably hook into the ear, N, on the rear axle of the machine and to be folded together for compactness, substantially as described for the purpose specified.

2. In a railroad velocipede, the combination of the frame constructed similar to the diamond-shaped frame of a safety bicycle; the forwardly extending arms, C, C, from the lower front angle of said frame engaging the axle, t; the axle, t, at the lower end of the fork; the rubber cushion or bushing around the forward axle, t, to permit the fork to be slightly turned to guide the machine, for the purpose specified.

3. In a railroad velocipede, the combination of the main frame constructed similar to the diamond-shaped frame of a safety bicycle; forwardly extending arms, C, C, from the lower front angle of said frame; the fork, E, suitable means of adjusting said fork, E, to guide the machine to prevent friction on the flanges of the wheels; and the elastic connection between the forward axle and arms, C, to permit the fork to be slightly turned in the operation, for the purpose specified.

4. In a railroad velocipede, the combination with the main frame, of the bars, B, B, C, C, extending from the rear axle through to the forward axle of the machine; a fork similar to the fork of a bicycle with the same means of guiding it carrying the forward wheel of said machine; a spring connection between the axle and forward end of the fork to guide the machine properly upon the rails, for the purpose specified.

5. In a railroad velocipede, the combination of the main frame; a guiding fork carrying the axle of the forward wheel of said velocipede; and an elastic yielding connection between the forward axle and the main frame to afford a support for the forward axle and permit a slight turning of the fork to properly guide the machine, for the purpose specified.

6. In a railroad velocipede, the combination of a main frame constructed similar to the diamond-shaped frame of a safety bicycle; forwardly extending arms, C, C, from the lower front angle of said frame connected to the forward axle of the same; forwardly extending arms, D, D, pivoted on said axle and bearing cross-piece, D', in front of the machine, to afford a foot rest; a seat connected to the head of the frame; and rods, a, a', containing adjustable clamps, e, for adjusting the height of the foot rest, for the purpose specified.

7. In a railroad velocipede, the combination of the main frame constructed similar to the diamond-shaped frame of a safety bicycle; the forwardly extending arms, C, C, from the lower front angle of said frame connected to the forward axle of the same; forwardly extending arms, D, D, pivoted on said axle and bearing a cross-piece, D', in front of said machine to afford a foot rest; and a seat connected to the head of the frame conveniently arranged in connection with said foot rest, for the purpose specified.

8. In a railroad velocipede, the combination with the wheel, of a sheet metal rim with a bead, n, and flange, n', formed at either side and a groove depressed in the middle portion thereof to receive the heads of the spokes; a rubber cushion, R', in the groove over the heads of the spokes; and a rubber tire, R, over said cushion, R', substantially as described for the purpose specified.

9. In a railroad velocipede, the combination with the ordinary diamond-shaped frame of a safety bicycle; of arms, C, C, projecting forward and engaging with the axle, t; a curved bar, F, attached to the forward head of the bicycle frame and to one of the bars, C; and suitable ears upon the same for attaching the cross arms, J, J'; and a guide wheel, L, on the end of said arm to rest upon the opposite rail of the track to guide and support the machine, for the purpose specified.

In witness whereof I have hereunto set my hand and seal in the presence of two witnesses.

GEORGE W. MILLER. [L. S.]

Witnesses:
MARIAN LONGYEAR,
WALTER S. WOOD.